(12) United States Patent
Powell et al.

(10) Patent No.: US 6,395,954 B2
(45) Date of Patent: May 28, 2002

(54) ADVANCED VITRIFICATION SYSTEM FRIT

(75) Inventors: James R. Powell, Shoreham; Morris Reich, Kew Gardens Hills, both of NY (US)

(73) Assignee: Radioactive Isolation Consortium, LLC, Falls Church, VA (US)

( * ) Notice: Subject to any disclaimer, the term of this patent is extended or adjusted under 35 U.S.C. 154(b) by 0 days.

(21) Appl. No.: 09/740,916

(22) Filed: Dec. 20, 2000

Related U.S. Application Data

(63) Continuation-in-part of application No. 09/350,194, filed on Jul. 9, 1999, now Pat. No. 6,211,424.
(60) Provisional application No. 60/094,593, filed on Jul. 30, 1998.

(51) Int. Cl.[7] ................................................. G21F 9/16
(52) U.S. Cl. ............................ 588/11; 588/20; 588/252
(58) Field of Search ............................ 588/1, 2, 10, 11, 588/16, 20, 252

(56) References Cited

U.S. PATENT DOCUMENTS 4,943,395 A * 7/1990 Sasaki et al. ................ 252/629
5,461,185 A * 10/1995 Forsberg et al. .............. 588/11
5,678,237 A * 10/1997 Powell et al. ................. 588/11

OTHER PUBLICATIONS

Vienna et al, The Role of Frit in Nuclear Waste Vitrification, Environmental and Waste Management Issues in the Ceramic Industry II, The American Ceramic Society, pp. 311–325 (No date given).*
Smith et al, Frit Specification Development: Letter Report, Pacific Northwest Laboratory, Mar. 1996.*

* cited by examiner

Primary Examiner—Steven P. Griffin
Assistant Examiner—Eileen E. Nave

(57) ABSTRACT

A process for improving waste vitrification in a disposable canister. In the process, chunks of frit are combined with waste and then added to the disposable canister. The waste and frit are then heated to melt the frit and waste. The melted mixture is then cooled to form a vitrified product in the module.

4 Claims, 1 Drawing Sheet

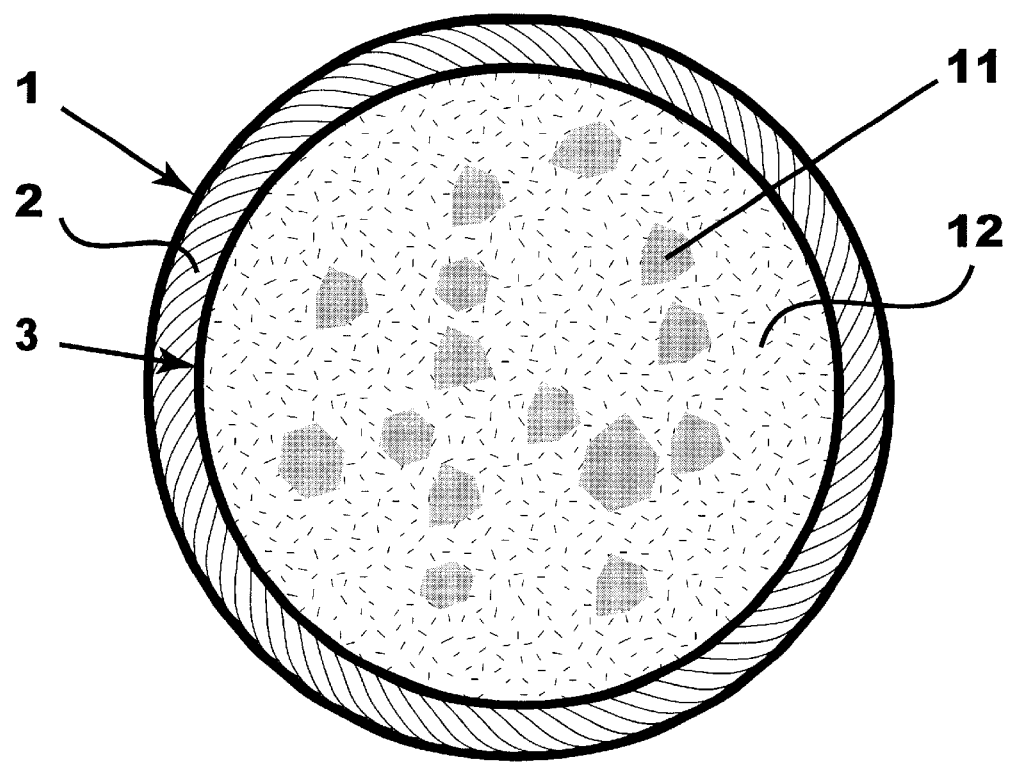

ADVANCED VITRIFICATION SYSTEM FRIT

This is a Continuation-in-Part (CIP) Application of pending application Ser. No. 09/350,194 filed Jul. 9, 1999, now U.S. Pat. No. 6,211,424. This CIP application claims the benefit of the filing date of U.S. patent application Ser. No. 09/350,194 filed on Jul. 9, 1999, now U.S. Pat. No. 6,211,424, which in turn claims the benefit of U.S. Provisional Application No. 60/094,593 filed on Jul. 30, 1998.

BACKGROUND OF THE INVENTION

The invention, which is sought to be protected in this CIP application, relates generally to hazardous wastes, and, more specifically, to vitrification thereof for long term storage.

U.S. patent application Ser. No. 09/350,194 and the disclosure of U.S. Pat. No. 5,678,237, which provides a device and method of in-situ vitrification of waste materials in a disposable canister, are hereby incorporated herein by reference. The disposable canister is a module comprising an inner container, an outer container, and insulation therebetween. The outer container serves as the traditional disposal container typically made of steel, which is thermally insulated from an inner container, typically of made of graphite. The inner container serves as a crucible to melt a waste/frit mixture and contain a molten vitrified product. The inner container is typically made of graphite and is typically heated by induction.

The frit material in the traditional process is granulated, that is, it is in the form of fine granules, typically 100 mesh or smaller. The invention sought to be protected is a method using solid chunks of material having a minimum dimension through the centroid of the chunk of about one-eighth of an inch.

BRIEF SUMMARY OF THE INVENTION

The Advanced Vitrification System Frit (AVSF) invention is an improvement on the method for vitrification of wastes in a final disposal canister. The invention will help to improve and control product glass quality, shorten the required melt period, maximize glass fill fraction in the canister, control time and temperature profiles for a melt, and maximize heat transfer rate from a heated inner container into the interior of the melt. In the process, chunks of frit are combined with waste and then added to the disposable canister. The waste and frit are then heated to melt the frit and waste. The melted mixture is then cooled to form a vitrified product in the module.

BRIEF DESCRIPTION OF THE DRAWINGS

The drawing illustrates the use of solid frit chunks in a disposable canister.

DETAILED DESCRIPTION OF THE INVENTION

The AVSF invention provides new and useful art improving to the processing of wastes within a disposable canister. In particular, the AVSF invention provides for the use of solid chunks of frit, instead of the traditional finely ground, or granulated, frit mixed with the waste particles. The preferred embodiment in a disposable canister is shown in the drawing. The drawing displays the top view of a disposable canister, or module, having an inner container (3), an outer container (1) with insulation (2) therebetween. Chunks of frit are combined with waste, and then added to the inner container. Shown in the drawing are the chunks of frit (11) mixed with the waste (12) after having been added to the inner container. The inner container is then heated by induction to melt the frit and waste. The melted mixture is then cooled to form a vitrified product (also known as "glass product," "product glass," or simply "glass") in the module.

Use of solid frit chunks in a disposable canister provides process advantages over use of finely ground frit. The advantages aid in: improving and controlling the quality of glass product, shortening the required melt period, maximizing the glass fill fraction in the canister, controlling the time and temperature profile of the process, and maximizing heat transfer rate from heated graphite crucible into the canister interior.

The traditional approach of using a finely ground frit mixed with waste has several disadvantages for waste vitrification in a disposable canister. Using a finely ground, granular bed of mixed frit material and waste can result in a low fill fraction of solid vitrified product inside a disposable canister. The fill fraction is the ratio of the volume of vitrified product in the canister over the fillable volume of the canister.

A disposal canister can be loaded with a single charge of waste or it can be filled in a continuous process. For processing using a single charge of waste in a disposable canister, volume reduction from melting a finely ground frit (typically 100 mesh) with waste can leave a final glass product occupying less than 60% of the fillable container volume, that is, it can have a fill fraction less than 60%.

The improved methodology of the invention helps to maintain a high glass fill fraction in a disposable canister. This is important with regard to the necessary shielding weight and transport capability of the transport units that carry the processed canisters to their final disposal site. A high fill fraction, e.g. greater than 80 percent, can also be an important parameter if there are restrictions on the size and number of disposal canisters that the final repository will accept.

Using a finely ground granular bed of mixed frit material and waste requires a relatively long melt time due to the low thermal conductivity of the mixture. This in turn results in a high energy for maintaining the melt temperatures during the longer processing times. These drawbacks are avoided with the AVSF invention.

This use of chunks of frit is the means to greatly increase the rate of heat transfer into the canister, i.e., by a factor of about 10, because the thermal conductivity of the solid glass is an order of magnitude greater than that of a bed of granular particles. The chunks of frit in the AVSF invention typically should have an approximate minimum cross-sectional dimension through the chunk's center of mass equaling about one-eighth of an inch, that is, about one-eighth of an inch or larger in any cross sectional dimension through the center of mass.

For conventional high temperature melters, such as a joule melter, the molten waste poured into the canister contains about 25 percent waste by volume of total vitrified product. Achieving much higher percentages of waste in a conventional melter is probably not possible since the necessary melt temperature is several hundred degrees Centigrade hotter than the about 1100 degrees Centigrade needed for a 25 percent loading. Such temperatures are too great for the required reliability of the conventional melter.

A vitrified product with a higher percentage of waste is possible if higher melt temperatures are used, such as are achievable using the AVSF method in a disposable canister. The AVSF invention reduces the time to melt the mixture by a factor of as much as ten compared to a conventional pot melter. This shorter processing time permits greater control of the time/temperature profile of the mixture and shorter exposure of the canister to the high melt temperatures enhances the potential to achieve high waste loadings.

Disposable canisters employing the AVSF method can actually hold more radioactive waste than conventional pour type canisters of the same outer dimensions. A disposable canister using the AVSF invention could hold up to 50% more waste than a conventional canister of the same outer dimensions, assuming 1) that the disposable canister can be loaded with 45% waste oxides as a result of its higher temperature capability as compared to the 25% oxide loading capability of conventional large central melters, 2) solid chunks of frit are used, and 3) the thickness of the thermal insulation and the graphite crucible is about 1 inch.

In all embodiments of the invention, the method of using the invention first mixes the chunks of frit with waste. Then, the waste and frit is loaded into the disposable canister. Then, the heating process takes place and the waste and frit mixture are melted. Finally, the vitrified product is cooled inside the disposable canister.

EXAMPLE 1

Example 1 illustrates a preferred embodiment of the Advanced Vitrification System Frit used for the concentration and vitrification of high-level radioactive wastes. The canister is a module having an inner container (3) made of graphite having a ceramic coating on the inside. The inner container serves as a crucible to vitrify the wastes. The module has an outer container (1) typically made of stainless steel. Thermal insulation (2) is located between the inner container and the outer container. Chunks of frit (11) are mixed with high level radioactive waste (12), and the resulting mixture is added to the inner container. The minimum size of the chunks of frit are such that the thermal conductivity of the frit and waste in the inner container is about 10 times the thermal conductivity of what a mixture of granular particle frit (about 100 mesh size) and waste would be in the same container. The inner container is then inductively heated to the vitrification temperature and then cooled.

EXAMPLE 2

Example 2 illustrates another preferred embodiment of the Advanced Vitrification System Frit used for the concentration and vitrification of high-level radioactive wastes. The canister is a module having an inner container (3) made of graphite having a ceramic coating on the inside. The inner container serves as a crucible to vitrify the wastes. The module has an outer container (1) typically made of stainless steel. Thermal insulation (2) is located between the inner container and the outer container. Chunks of frit (11), each chunk having a minimum length, height and width through said chunk's center of mass equaling about one-eighth of an inch, are mixed with high level radioactive waste (12), and the resulting mixture is added to the inner container. The inner container is then inductively heated to the vitrification temperature and then cooled.

While there has been described herein what is considered to be the preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A method for improving and controlling product glass quality, shortening a required melt period, maximizing glass fill fraction, controlling time and temperature, and maximizing heat transfer in a process for the vitrification of wastes in a disposable canister comprising:
   a. mixing waste with frit wherein the frit is in the form of one or more solid chunks having a minimum size such that the thermal conductivity of the frit is about 10 times the thermal conductivity of a bed of granular particle frit;
   b. loading the mixed waste and frit into a canister;
   c. heating the mixed waste and frit inside the canister until a melted mixture is obtained; and
   d. cooling said melted mixture to form a vitrified product.

2. The method according to claim 1 wherein said canister is a module having an inner container, an outer container and a thermally insulating material between said inner container and outer container.

3. A method for improving and controlling product glass quality, shortening a required melt period, maximizing glass fill fraction, controlling time and temperature, and maximizing heat transfer in a process for the vitrification of wastes in a disposable canister comprising:
   a. mixing waste with chunks of frit, wherein each chunk of frit has a minimum cross-sectional dimension through said chunk's center of mass equaling about one-eighth of an inch;
   b. loading the waste and chunks of frit into a canister;
   c. heating the waste and chunks of frit inside the canister until a melted mixture is obtained; and
   d. cooling said melted mixture to form a vitrified product.

4. The method according to claim 3 wherein said canister is a module having an inner container, an outer container and a thermally insulating material between said inner container and outer container.

* * * * *